United States Patent [19]

Boerwinkle et al.

[11] 4,290,912
[45] Sep. 22, 1981

[54] VOLATILE CORROSION INHIBITING ARTICLE

[75] Inventors: Fred P. Boerwinkle, St. Paul, Minn.; Donald A. Kubik, Somerset, Wis.

[73] Assignee: Northern Instruments Corporation, Lino Lakes, Minn.

[21] Appl. No.: 123,395

[22] Filed: Feb. 21, 1980

[51] Int. Cl.$^3$ ................ C23F 11/02; C23F 11/12; C23F 11/18
[52] U.S. Cl. .................... 252/389 R; 106/14.41; 106/14.44; 422/8; 422/9
[58] Field of Search ............... 252/389 R; 106/14.41, 106/14.44; 422/8, 9

[56] References Cited

U.S. PATENT DOCUMENTS

| | | | |
|---|---|---|---|
| 2,739,871 | 3/1956 | Senkus | 252/392 |
| 2,829,080 | 4/1958 | Fessler et al. | 428/483 |
| 3,080,211 | 3/1963 | Fessler et al. | 422/8 |
| 3,785,975 | 1/1974 | Humphrey et al. | 252/392 |
| 3,936,560 | 2/1976 | Santurri et al. | 422/8 |

Primary Examiner—Benjamin R. Padgett
Assistant Examiner—Irwin Gluck

[57] ABSTRACT

Plastic articles having volatile corrosion inhibiting properties are described. The plastic articles comprise polyolefin polymer, an inorganic nitrite salt, a trisubstituted phenol and fumed silica.

7 Claims, No Drawings

VOLATILE CORROSION INHIBITING ARTICLE

BACKGROUND OF THE INVENTION

This invention relates to corrosion inhibition. More particularly, this invention relates to novel plastic articles which provide volatile corrosion inhibition.

Volatile or vapor phase corrosion inhibitors have been used in a variety of applications where visible coatings such as oil or grease or other permanent coatings such as paints are unacceptable for various reasons. Sodium nitrite, amine nitrite salts, organic amines, carboxylic acids and organic amine carboxylic acid salts have all been disclosed singularly and in combination in volatile corrosion inhibiting compositions (e.g. as described in U.S. Pat. Nos. 2,629,649: 2,711,360: 2,986,447: 3,398,095: 3,433,577: 3,785,975: and 3,967,926). Sheet materials useful for packaging metal parts containing volatile corrosion inhibiting compositions have also been disclosed (e.g. as described in U.S. Pat. Nos. 2,717,843: 2,739,871: 2,829,080: and 3,080,211). Sodium nitrite is known as an effective volatile corrosion inhibitor when carbon dioxide and water are present in the air. However, in the absence of carbon dioxide, its effectiveness as a volatile corrosion inhibitor drops off abruptly, as described in Metaux 1972 47(558), 41–50.

SUMMARY OF THE INVENTION

We have unexpectedly discovered that a mixture of an inorganic nitrite, a trisubstituted phenol and fumed silica, when mixed with polyolefin polymer, yields a plastic article having highly effective volatile corrosion inhibiting properties regardless of carbon dioxide concentration in the environment. The novel article of the present invention comprises:
(a) polyolefin polymer;
(b) an inorganic nitrite salt:
(c) a 2,4,6-trisubstituted phenol containing 9 to 24 carbon atoms, and
(d) fumed silica.

DETAILED DESCRIPTION OF THE INVENTION

The volatile corrosion inhibiting articles of the invention comprise (a) polyolefin polymer, (b) an inorganic nitrite salt, (c) a trisubstituted phenol and (d) fumed silica.

The organic polymers useful in the preparation of the volatile corrosion inhibiting articles of the present invention are those which can be thermally processed to make articles such as films or sheets, injection molded parts, or plastisols. Typical useful polymers include polyolefin polymers such as polyethylene, polypropylene, ethylene/vinyl acetate copolymers, vinyl acetate/vinyl chloride copolymers and polyvinyl chloride. Processing aids may optionally be included, such as plasticizers (e.g. dioctyl phthalate, tricresyl phosphate, etc). Other inert materials may also be included such as fillers, colorants and other conventional additives.

The inorganic nitrite salts useful include metal nitrites (preferably Group I and II metal nitrites) such as potassium nitrite, sodium nitrite and calcium nitrite. A particularly preferred nitrite salt is sodium nitrite.

The trisubstituted phenols which are useful are substituted in the 2,4 and 6 positions with alkyl, hydroxyalkyl, aryl, alkenyl or hydroxyalkenyl. A particularly preferred phenol is 2,6 di-t-butyl-4-methyl phenol.

The fumed silica which has proven useful is available commercially under the tradename "Cab-O-Sil" from the Cabot Corporation.

The invention is further illustrated by means of the following examples wherein the term parts refers to parts by weight unless otherwise indicated.

Examples 1 and 2 describe the preparation of volatile corrosion inhibiting articles by means of plastisol formation.

The plastisols were prepared by mixing all of the following ingredients together to form a uniform paste and then heating.

EXAMPLE 1

| | |
|---|---|
| Sodium Nitrite | 3 parts |
| "Ionol" (1) | 2 parts |
| "Cab-O-Sil" (2) | 0.1 parts |
| Oleyl Alcohol | 3 parts |
| "Microthene FE-532" organic polymer (3) | 8 parts |

(1) "Ionol" is 2,6 di-tert-butyl-4-methyl phenol (commercially available from the Shell Chemical Company).
(2) "Cab-O-Sil" is fumed silica (available from Cabot Corporation).
(3) "Microthene FE-532" is ethylene-vinyl acetate copolymer (commercially available from U.S. Industrial Chemical Corporation).

The plastisol formed by heating the mixture shown in Example 1 at 250° F. for 30 minutes showed little degradation and demonstrated excellent volatile corrosion inhibiting properties using test method FTM-101B Method 4031.

EXAMPLE 2

A plastisol was formed as in Example 1 with the following composition similar to one described in U.S. Pat. No. 2,829,080:

| | |
|---|---|
| Urea | 10.7 parts |
| Sodium Nitrite | 21.5 parts |
| Oleyl Alcohol | 21.5 parts |
| "Microthene FE-532" organic polymer | 35.5 parts |

The resulting plastisol exhibited considerable darkening and decomposition after being heated at 250° F. for 30 minutes.

EXAMPLE 3

This example describes a volatile corrosion inhibiting article in the form of an extruded thermoplastic film. The following ingredients were mixed uniformly.

| | |
|---|---|
| Sodium Nitrite | 1.485 parts |
| "Ionol" | 1.485 parts |
| Fumed Silica | 0.03 parts |
| Low density polyethylene | 97 parts |

This mixture was extruded into film at a temperature of 300° F. The resultant film showed no discoloration or gas formation and possessed excellent volatile corrosion inhibiting properties when tested against mild steel.

What is claimed is:
1. An article having volatile corrosion inhibiting properties comprising
   (a) a polyolefin polymer
   (b) an inorganic nitrite salt
   (c) a phenol of the formula

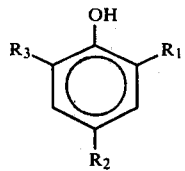

where $R_1$, $R_2$ and $R_3$ are selected from alkyl, aryl, alkenyl, hydroxyalkyl, hydroxyalkenyl and where the sum of carbon atoms in $R_1$, $R_2$ and $R_3$ is in the range of 3 and about 18, and (d) fumed silica.

2. An article in accordance with claim 1, wherein the weight ratio of said nitrite salt to said phenol is in the range of about 1:10 to 10:1.

3. An article in accordance with claim 1, wherein the weight ratio of said fumed silica to combined weight of said nitrite salt and said phenol is in the range of 1:1,000 to 1:10.

4. An article in accordance with claim 1, wherein said nitrite salt comprises sodium nitrite.

5. An article in accordance with claim 1, wherein said polyolefin is selected from polyethylene, polypropylene and ethylene/vinyl acetate copolymers.

6. An article in accordance with claim 1 in the form of a film.

7. An article in accordance with claim 1 in the form of a plastisol.

* * * * *